3,015,544
METHOD OF PREPARING A CHEMICAL BLANK SAMPLE

George E. Shaffer, Jr., Philadelphia, Pa., and George W. Schneider, Jr., St. Petersburg, Fla., assignors to Milton Roy Company, Philadelphia, Pa., a corporation of Pennsylvania
No Drawing. Filed May 28, 1958, Ser. No. 738,263
18 Claims. (Cl. 23—230)

This invention relates to a method of chemical analysis and more particularly provides a novel method for producing a blank sample the optical qualities of which differ from those of a test sample by an amount which is a true measure of the amount of a unique component present in a fluid medium.

As industrial techniques advance, trace components become of increasing importance and critically. Whereas previously an amount, say, of less than 500 parts per billion of a component would be considered negligible, it has now become common to monitor substances present in amounts as low as 50 parts per billion and below. Thus for example, in the operation of steam boilers for the propulsion of turbines and the like, increasingly higher temperatures and pressures have been employed. As these operating conditions are made more strenuous, it is found that the quality of the boiler feed water becomes a limiting factor. At the higher pressures and temperatures, different phase relationships exist and the scale produced by deposition of ionic components of the feed water changes entirely in character and composition. Additionally, new problems of corrosion arise: different materials of construction must be selected when the more strenuous operating conditions are employed, and corrosion of these materials may be catalyzed by trace amounts of feed water components. Accordingly, it becomes important to monitor the feed water composition.

Analytical methods depending on optical effects are particularly adapted for the quantitative measurement of components of fluid systems present only in very low amounts. Electrochemical analytical methods are in general not accurate below about 100 parts per billion, but optical methods will give precise results down to far below this figure. The optical methods of analysis are not only accurate in the low concentration ranges, but they are also well adapted for use in continuous analytical control monitoring systems.

A variety of techniques are used in optical methods of analysis, but in essence, each operates on the same principle. A fluid in the path of a beam of light will interfere with and alter the characteristics of the light impinging thereon. The extent to which the fluid exerts this effect can be measured. Colorimetry and turbidimetry are techniques in which light transmitted by the fluid is measured. Where the fluid is substantially opaque, reflectometry may be used.

For the purposes of quantitative analysis, a fluid medium to be analyzed for a given unique component is treated with a reagent reactive with this component to result in an optical effect proportional to the concentration of the component. This optical effect may comprise a change in the color of the fluid, creation of turbidity due to formation of a finely divided precipitate which remains suspended in the fluid, induced fluorescence or the like. Selection of a particular effect will depend on considerations such as the qualities of the component to be measured, the nature of the fluid medium, and the availability of reagents producing the desired effect. The appropriate optical analytical technique is then applied to determine the extent of the effect produced.

Measurement of the optical effect is accomplished by comparing a test sample with a blank sample. The optical qualities of fluid placed in the path of a beam of light will be affected by all of the materials entering into the composition of the fluid. To isolate the optical effect contributed by the component to be measured, the optical qualities of the fluid are determined by difference. In the test sample, the factors affecting the optical quality of the fluid include the optical effect contributed by the component to be measured, as developed by reaction of the component with reagent reactive therewith to result in this effect. The blank sample theoretically should reproduce all of the same factors except that of the optical effect resulting from the component. Subtraction of the optical effect exerted by the blank sample from that of the test sample gives the required value for the effect contributed by the component.

Insofar as the composition of the blank sample does reproduce that of the test sample, a convenient self-compensation is achieved in respect to certain possible sources of error in the analysis. Thus, reagents may tend to change color on aging. If any reagent introduced into the test sample is also introduced into the blank sample, the optical effect contributed by the reagent to each cancels out.

The optical effect resulting from the component to be measured must, however, be absent in the blank sample. To accomplish this, fluid medium theoretically devoid of the component to be measured has been employed to prepare the blank sample. However, provision of such fluid medium is a source of error and uncertainty in the analysis. In practice, it is extremely difficult to produce a fluid medium identical with the test medium except for the absence of the unique component the amount of which is to be measured, especially when very small amounts of components are in question.

The standard approach to this problem is to subject a portion of the fluid medium to a purification procedure by which the unique component is removed. To accomplish this with certainty, however, is not generally easy. In particular, it is difficult to devise a purification procedure which is reliable and at the same time is sufficiently rapid for industrial purposes, particularly for purposes of continuous monitoring installations. Demineralizers have been employed to purify fluid media. As is well known, demineralizers are mixtures of anionic and cationic resins which together will remove substantially all the ion content from fluid media. However, they operate by an equilibrium process. During start-up and shut-down, erratic results are obtained. Furthermore, whereas demineralizers will initially be highly efficient in deionization of water or other fluid media, their effectiveness will gradually decrease in use. Accordingly, the use of a demineralizer is less reliable than would be desired for accomplishment of the purpose of removing a given ionic component from a fluid medium.

Furthermore, when a fluid medium free of a given unique component is prepared by a purification process, it will generally also be deficient for comparison purposes for the reason that the purification process may and frequently often does remove other components than the particular component in question. Thus if water is passed through a demineralizer, ions other than the particular ion under consideration will also be removed simultaneously. This may have some affect on the optical qualities of the water. What is more, other factors affecting the optical qualities of the fluid media may also be affected: for example, if the fluid medium to be subjected to the purification process were originally turbid to any extent, the fluid medium issuing from the purification process in which the given unique component had been removed might also well be diminished in turbidity or completely devoid of the turbidity it originally had.

As will be readily evident, equal difficulties are encountered should it be desired to provide a comparison fluid medium devoid of the given unique component to be measured while avoiding the purification approach. Thus, if on the one hand an aqueous test sample were compared on the other hand with a blank sample in which the water was derived from a different source entirely, known to be free of the component to be analyzed for, then again factors affecting the optical qualities of the two aqueous media such as turbidity might well differ by a large amount.

As an alternative approach to the preparation of a blank sample, it has been proposed that the reagents be omitted therefrom. The blank sample may then comprise an aliquot portion of fluid medium identical with that introduced into the test sample, for in the absence of reagent reactive with the component to be measured, the resulting optical effect is absent. Compensation is thereby provided in the blank sample for possible turbidity or other intrinsic optical qualities of the fluid medium to be analyzed. However, such a procedure fails to compensate for contributions to the optical qualities of the test sample made by the reagents. On the assumption that the reagents are colorless, the blank sample is made up to a volume equal to that of the test sample by adding to the fluid medium a volume of distilled water equal to the volume of the reagents introduced into the test sample. This opens the method to the possibility of two sources of error. First, the reagents will not necessarily in fact be devoid of effect on the optical qualities of the test sample. Thus for example, the reagents may darken on aging, particularly when the method is employed in a continuous analytical system where it is desirable to avoid requirements for the use of freshly prepared reagents. Secondly, such a mode of preparing the blank sample fails to compensate for the possibility that the reagents themselves may contain an appreciable quantity of the component to be measured. To the extent that the reagents do contain this component, the optical effect resulting therefrom will contribute to the optical qualities of the test sample. Accordingly, when such a procedure is used in which the reagents are absent from the blank sample, it is necessary to suppress contribution thereby to the component content of the test sample by employing highly purified reagents. The method is accurate only to the extent that the reagents themselves are free of the component.

From the foregoing discussion, it will be evident that whenever the materials entering into the composition of the test sample are different from those introduced into the blank sample, analytical methods depending on comparison thereof are subject to sources of error. Accordingly, in procedures for measurement of the amount of a unique component in a fluid medium which involve comparison of a test sample and a blank sample differing in optical quality, it would be highly desirable to provide a method in which the materials entering into the composition of each of the test and blank samples would be identically the same and the test and blank samples would differ in optical qualities solely by an amount resulting from the unique component to be analyzed in the fluid medium.

It is an object of this invention to provide a novel method of chemical analysis.

It is a further object of this invention to provide a process in which control of an optical quality is affected.

A particular object of this invention is to provide a method adapted for the analysis of a fluid medium for a unique component, comprising the preparation of a test sample and a blank sample wherein the materials entering into the composition of said samples are identically the same, but wherein the samples differ in optical quality by an amount proportional to the quantity of unique component present in said medium.

These and other objects will become evident from a consideration of the following specification and claims.

In accordance with the novel method of this invention, in a procedure wherein a test sample and a blank sample are provided for optical comparison, the blank sample is prepared by sequentially mixing a plurality of reagents in defined amount and sequence, said reagents comprising a first reagent reactive with a unique component of a fluid medium to result in an optical effect, and a second reagent effective to short-stop reaction between said reagent and said component, the sequence of mixing being such that said second reagent is introduced subsequently to said first reagent; and thereafter mixing the resulting mixture of reagents with an aliquot portion of fluid medium to be analyzed for said unique component. A test sample for optical comparison therewith will be prepared by sequentially adding said plurality of reagents in said defined amount and sequence to an aliquot portion of said fluid medium, whereby said reagents are mixed in the presence of said fluid medium. In accordance with this method, the same materials in the same amounts enter into the composition of the test sample and the blank sample. However, as a result of the particular sequence in which the ingredients of the blank sample are mixed, as compared with the sequence in which those of the test sample are mixed, the samples will differ in optical quality by an amount which is an accurate measure of the quantity of said component present in said fluid medium.

The present method is highly advantageous in that it substantially eliminates sources of error and uncertainty, thereby affording extremely accurate results. The method is independent of reliance on procedures for purifying the fluid medium of the blank sample of component to be measured. Furthermore, the factors affecting optical quality of the fluid medium to be analyzed in addition to its content of component to be measured are maintained equal in each of the test and the blank samples, since the same fluid medium is introduced into each. The same amounts of the reagents are also introduced into each of the samples, so that automatic compensation is provided for the optical effects which these materials may exert due to aging or the like. Additionally, as will become evident hereinafter, this method also compensates for any content of the component to be measured present in the reagents, so that this factor also cancels out when the samples are compared. The samples are then entirely identical in optical qualities except for the optical effect developed by the component content of the fluid medium in the test sample. The gross differences between test and blank samples in respect to the composition thereof are obviated, the difference in optical qualities being limited specifically to the quality to be measured. There is thus provided a method which can be considered to provide a substantially absolute measure of the quantity of unique component in fluid medium to be analyzed.

Another advantageous property of the present method, in addition to the accuracy thereof, resides in the above-mentioned fact that it automatically compensates for the contribution made to the optical qualities of the sample by any quantities of the component to be measured which may be present in the reagents used. Where a blank sample is prepared by a procedure which does not compensate for this factor, it is necessary to subject the reagents employed to rigorous purification procedures in order to obtain valid results. On the other hand, upon proceeding in accordance with the present method, the reagents selected can be of ordinary technical grade. Insofar as the reagents do contain any of the component for which the fluid medium is to be analyzed, an equal optical effect results therefrom in the test and the blank samples, and this is subsumed in the total of the optical qualities of each of the samples which are eliminated by difference.

Similarly, the present method is advantageous in that it obviates the necessity for providing apparatus to purify a fluid medium to be used in preparing a control sample.

A further advantageous feature of this method is the adaptability of the method to continuous and automatic analysis systems. It is frequently desirable to maintain a constant check on the quality of fluid media, and automatic analytical control systems are used for this purpose. In the present method, the steps to be performed in preparation of the test and blank samples are substantially identical, except for the order of their performance. It is thus well adapted to mechanization, and may advantageously be employed in automatic systems.

Considering now the practice of the method of this invention, as indicated hereinabove, the essential difference in the preparations of the test and the blank samples will reside in the point at which the fluid medium is introduced thereto. On the one hand, the test sample is prepared by addition of reagents to fluid medium to develop an optical effect, the fluid medium being provided at the initial stage, and the reagents being added sequentially to the medium. The blank sample, however, is prepared by addition of the fluid medium to the reagents, the reagents being introduced in the same sequence as in the test sample, but the fluid medium being introduced subsequent rather than prior to said reagents. Identically the same materials are introduced, in the same amounts, to provide the blank sample and the test sample; but the order of addition of the fluid medium on the one hand and of the reagents, on the other, is reversed.

There are two reagents to be considered in connection with the point of addition of the fluid medium to the respective samples. The first of these is reagent reactive with the component of the fluid medium under consideration, to result in an optical effect. In the test sample, fluid medium containing the component will be introduced into the comparison cell or other container before the introduction of the stated reactive reagent, so that development of the desired optical effect is initiated. In the blank sample, addition of the fluid medium will take place after introduction of the stated reagent, and furthermore, after introduction of short-stop reagent.

The method of the invention is effectuated by employing as one of the plurality of reagents used, a reagent effective to "short-stop" reaction between said component and reagent. "Short-stop," as a chemical term, as it is used in processes such as photographic development, rubber synthesis, and so forth, designates a reagent which will effectually prevent any further progress of an irreversible reaction between two or more compounds.

The introduction into each of the samples of reagent reactive with the component of the fluid medium to lead to production of an optical effect, insofar as the stated component is present, will initiate reaction therewith. In the test sample, to which the fluid medium has been introduced prior to addition of the stated reagent, such reaction will occur at least to the extent that the component is present in the fluid medium. In the blank sample, whether any reaction at all occurs will depend on whether other reagents which may contain the component have previously been introduced. As will become evident hereinafter, it will be possible that such other reagents may be present. In any case, the blank sample will not yet contain the fluid medum, so that contribution of component from this source will be absent.

Thereafter, short-stop reagent is introduced into each of the test and blank samples. This reagent then stops and prevents any further reaction of the component with the stated reagent reactive therewith to result in an optical effect. Following introduction of the short-stop reagent, although both the component and the stated reagent reactive therewith may be present in the mixture produced, reaction therebetween is effectually inhibited.

Accordingly, fluid medium containing the component to be measured may now be introduced into the control sample without development of optical effect deriving from the said reaction. There is thus provided a method whereby the desired result is achieved of producing a blank and a test sample in which all the factors contributing to the optical qualities thereof are maintained equal, with the sole exception of the specific optical effect of the component to be measured. By including a short-stop reagent in the system of reagents employed, in conjunction with control of the point of introduction of the fluid medium a component of which is to be measured, development of the optical effect proportional to the component concentration is effectuated in the test sample, but suppressed in the blank sample.

The details of the manner in which the method of this invention is practiced will depend on the nature of the fluid medium, the component to be measured, the reagent system, and also the method by which the reagents affect the optical qualities of the system. For a given component in a given fluid system, a reagent or combination of reagents is selected which is capable of developing with the component, by an irreversible reaction, an optical effect proportional to the concentration of the component in accordance with the Beer-Lambert law. As will be appreciated by those skilled in the art, this need not be a direct effect of a product of reaction of the component and a reagent, but may be an indirect optical effect, as where the component reacts with a reagent to produce a particular product, and the latter substance in turn is further reacted to give an ultimate product, the optical effect of which is proportional to the concentration of the component. In any case, the reagent system selected is such that a short-stop reagent may form one of the reagents added, either as an essential step in the development of the required optical effect, or at least without interference therewith. The short-stop reagent is one which affects the reaction of the component with the reagent reactive therewith to result in an optical effect, terminating the reaction and preventing any further occurrence thereof. The method of this invention may then be applied, with the inclusion of the short-stop reagent in the reagent system ensuring that while in the test sample, there is developed the optical effect deriving from reaction of the fluid medium component with reagent reactive therewith, in the blank sample, on the other hand, the presence of the short-stop reagent prevents such reaction of fluid medium component when this is introduced thereto.

Generally, for the sake of supplying a medium in which the reagents may react with one another in the blank sample, and also for the sake of convenience in metering the amounts of reagents to be added to the blank and test samples, the reagents will be employed in the form of solutions. In the preparation of the blank sample, where the reagents employed will be admixed with one another prior to addition of the fluid medium the component content of which is to be measured, the concentration of reagents will usually be very much greater than in the test sample, where the reagents are added to the fluid medium and are thereby diluted. Ordinarily, the volume of fluid medium to be analyzed which is introduced into the test and blank samples will be substantially greater than the combined volume of the reagent solutions used in developing the desired color effect. Thus there may be a significant difference in reagent concentration between the test and the blank samples. In order to avoid a difference in effect which may come about as a consequence of the different concentrations at which the reagents are contacted with one another in the blank sample and in the test sample, it forms a preferred embodiment of this invention to provide an equalizing medium as one component of the system of reagents employed in practicing the method of the invention.

It has been found that an equalizing effect of the desired nature may be provided by employing a buffer solution as one of the system of reagents used. Buffer solutions are solutions of a mixture of an acid and a salt of the same acid. Such solutions will maintain a substantially constant hydrogen ion concentration (pH) over a range of dilution. Thus when a buffer solution is employed as a medium in which the reagents employed are contacted with one another, in either the test sample, where the fluid medium exerts a diluting effect on the reagents, or in the blank sample, where such diluting effect is absent during the period in which the reagents are contacted with one another, the buffer will provide a substantially constant environment. Accordingly, whereas otherwise concentration effects might influence and vary the optical qualities developed by the selected reagent system, the provision of a buffer medium will supply an equalizing factor effective to compensate for the differences in reagent concentration.

Selection of a particular buffer system for practice of the method of the invention will be governed by a consideration of the extent of dilution or concentration which will be encountered in the course of carrying out the method of analysis employed. Buffer systems will vary in the breadth of the range of dilution over which the pH of the solution will be maintained substantially constant. To effectuate the purpose of providing the equalizing effect of an effectively constant environment in the blank and test samples, accordingly, a buffer solution will be selected which will maintain a substantially constant pH over whatever range of concentration will be encountered in conducting the method of the invention. An additional consideration in selection of a buffer solution to be employed will be the particular substantially constant pH which it provides. Insofar as this affects the reactions by which the optical qualities of the test sample are affected, selection of an appropriate buffer solution for use in the method of the invention must also be limited by consideration of this factor. The qualities of buffer solutions as to pH produced and ranges of dilution which can be tolerated are well known, and are described in the literature for a large number of buffers; and when a given reagent system has been selected for use in the method of this invention, those skilled in the art will readily be able to select a buffer appropriate for use therewith.

When the method of the invention is operated in accordance with this preferred embodiment thereof, accordingly, the preparation of the blank sample will comprise as a first step, the introduction of a reagent comprising a buffer medium into the cell or other container in which the blank sample is to be produced. Thereafter there will be introduced one or more reagents reactive with the component to be measured to result in an optical effect proportional to the concentration of the component. Insofar as the buffer medium and any of the other reagents introduced to this point contain such component, reaction of the component will occur; however, inasmuch as the optical effect to be measured is the difference between the blank and test samples, and a parallel development of optical effect due to component content of the stated reagents will also take place in the test sample, the optical effects produced by the component contents of these reagents will cancel out upon comparison of the samples.

Proceeding then with the preparation of the blank sample, the next step will comprise the introduction of a reagent effective to short-stop any further reaction of the component with reagent with which it is reactive to result in optical effect. The short-stop reagent will further be effectual to prevent such reaction of component introduced to the sample thereafter.

Depending on the mechanism by which the selected reagent system produces an optical effect proportional to concentration of the component to be measured, it may or may not be necessary at this point to introduce one or more further reagents. Where, for example, the optical effect to be measured is not produced directly by a product of reaction of component and a reagent, but rather as a consequence of reaction of the said product with another reagent, addition of the further reagent will be required.

In addition to the foregoing, it is to be understood that besides the introduction of the selected reagents conducive to production of the optical effect sought, reagents may be introduced for the purpose of suppressing undesired side effects. The extent to which consideration of interfering reactions will be necessary will depend on many factors, such as the composition of fluid medium to be analyzed, nature of the reagent system selected, and so forth. Suppression of interfering reactions may readily be accomplished by means well known to the art, and will be provided for appropriately as required.

In the preparation of the blank sample to this point, the reagents will be added in a defined amount and sequence. It will be appreciated that of course each reagent will be introduced in an amount appropriate to its intended effect, considered in the light of the expected approximate concentration of component to be measured in the fluid medium to be analyzed. Thus, reagent acting to provide a buffer medium will be introduced in amount sufficient to maintain a substantially constant pH during subsequent operations. Reagent reactive with the component to be measured to result in an optical effect must be added in an amount sufficient to react completely with all of the quantity of the component which may be expected to be present in the system to be produced in either the blank or the test sample. Generally, such reagent will be present in excess. As stated above, the present method is contemplated particularly as it applies to measurement of very low concentrations of a given component, and ordinarily, the approximate amount of the component to be anticipated in the fluid medium will be known in advance, so that the amount of the stated reagent employed may be adjusted appropriately. Similarly, the amount of short-stop reagent to be added will be defined by the chemistry of the reactions involved in its function. Thus for example, where the short-stop reagent acts by destroying any unreacted reagent reactive with the component to be measured, the amount of short-stop reagent added will be proportional to the amount of the stated reagent previously introduced. On the other hand, the selected short-stop reagent may operate by acting on the component in question rather than on the stated reagent. Where this is so, the amount thereof introduced in preparation of the blank sample would be selected in anticipation of the subsequent addition thereto of fluid medium containing the said component. In any case, in a given system, the short-stop reagent will be introduced in an amount sufficient to effectuate its purpose of preventing any further occurrence of reaction between the component to be measured and reagent reactive therewith to result in an optical effect. In like fashion, where other reagents are to be introduced into the system, those skilled in the art will readily select amounts thereof to be introduced as defined by a consideration of the functions and effects of these reagents.

By reference to the defined sequence in which the reagents are introduced, there is intended to be comprehended both the order in which the reagents are introduced and also the time intervals at which they are added. Thus for example, to ensure substantially complete reaction between the component to be measured and reagent reactive therewith to result in an optical effect, it will be desirable to allow an appreciable time interval to elapse before such reaction is terminated by introduction of short-stop reagent. This time interval will be of controlled duration, thereby providing that the stated reaction proceeds to a given extent towards substantial completion in the respective samples. Similarly, other significant time intervals will be defined in establishing the mode in which the method of the invention is practiced in a particular case. The order of addition of the reagents to be employed will also be established, the chemistry of the several reactions involved being considered so that the method is operative to develop the required optical effect, and the order and time intervals of addition so established will define the sequence of introduction of the reagents.

To complete preparation of the blank sample, an aliquot portion of fluid medium containing component to be measured is introduced. Generally, the fluid medium will be added as the last step in preparation of the blank sample, but this is not essential. However, it is essential that the fluid medium be added subsequent to addition of the short-stop reagent to the cell in which the blank sample is prepared, as pointed out above. The fluid medium will dilute the blank sample system to an extent equal to that to which the corresponding test sample is diluted. The samples will then be optically comparable, having the same volume and presenting the same light path length. The fluid medium will also exert any optical effects it may possess due to factors other than its content of the component in question, such as discoloration, turbidity or the like. However, because of the presence of the short-stop reagent in the blank sample when the fluid medium is introduced, although reagent reactive with the component to result in an optical effect has been introduced into the sample, reaction of the component in the fluid medium with the stated reagent will be prevented.

The test sample is prepared by a procedure such that equal amounts of the same materials are introduced thereto as are provided to form the blank sample. The distinction between the preparations of the test and the blank samples is that in preparation of the test sample in the container cell wherein it is made up, an aliquot portion of the fluid medium a unique component of which is to be measured is introduced at an earlier stage. In preparing the test sample, the stated fluid medium is introduced prior to introduction of reagent reactive with the stated component to lead to development of an optical effect. In all other respects, the preparation of the test sample will parallel the preparation of the blank sample, the same reagents being added in the same defined amount and sequence. The buffer provided in accordance with the preferred practice of the method of the invention will establish a medium substantially equivalent to that present in the blank sample, despite the considerable differential in concentration which may exist between the test and the blank samples, so maintaining the requisite parallelism between the two.

If the selected method of development of an optical effect due to component content of the fluid medium should require manipulative steps such as heating, cooling or the like, similarly the test sample and the blank sample will be subjected to the same treatment, maintaining a parallelism in all respects except that of the point of introduction of the fluid medium.

There will thus be produced a test sample in which all of the factors contributing to the optical qualities are identical with those of the blank sample, with the one exception that the test sample will additionally exhibit an optical effect derived from reaction of the component content of the fluid medium with the reagent reactive therewith to result in an optical effect. The short-stop reagent being added to the sample after the stated reaction has occurred, in the test sample as compared to the blank sample, the short-stop reagent here does not prevent the development of optical effect deriving from the component content of the fluid medium and proportional to the concentration thereof. All other factors being equal, the one effect in which the differing methods of preparation of the respective samples permits a resulting difference in optical qualities to occur is restricted to an optical effect of the component content of the fluid medium. Instead of the gross effect of a variation in the fluid medium as a whole between the test and blank samples, then, it is the specific effect of the component content thereof which creates the difference in optical qualities; and thereby a substantially absolute measure of the concentration of the stated component in the fluid medium is afforded.

Physical measurement of the difference in optical qualities of the test sample and the blank sample may be accomplished by means well known in the art. Selection of a photometric method appropriate to the nature of the optical quality developed can readily be made by skilled chemists; ample description of such methods of making comparative measurement of optical quality is available in the literature. Similarly, it is well understood how to derive from such optical measurements the corresponding values for amount of measured component in the medium analyzed. When a test sample and a blank sample have been provided in accordance with the method of this invention, those skilled in the art will be readily able to employ these samples to obtain the desired quantitative value for amount of the component present in the fluid medium.

The method of this invention is of particular value, as stated hereinabove, for measurement of the amount of a given unique component present in relatively low concentration in a fluid medium. By low concentration in this connection is meant a concentration of below about 500 parts per billion (p.p.b.) and especially below about 100 p.p.b. This is a concentration range in which photometric methods of analysis are especially useful.

More specifically, the method of this invention possesses particular advantages for application in water analysis. In aqueous systems, trace components may exert significant effects, and it is frequently necessary to adopt monitoring measures in order to meter minute amounts of given components. Generally, it is required that these control metering procedures be continuous and automatic. The method of the present invention is well adapted for use in continuous and automatic systems, as pointed out hereinabove.

A particular analysis in connection with which the method of this invention offers desirable and valuable advantages is that of measurement of the soluble silica content of aqueous systems, especially of substantially pure water having a low but measurable silica content. Continuous automatic photometric procedures are commonly used for measurement of this component of aqueous systems; an advantageous apparatus adapted for the continuous metering of such a component of an aqueous system by a photometric method is described, for example, in copending application S.N. 738,524, filed of even date herewith.

A reagent system is known by which the soluble silica content of an aqueous system may be measured by a photometric method with considerable accuracy down to relatively low concentrations. This is known as the Armour Institute method; it is described in the literature in ASME paper number 51–A–92. The method as described in the literature, however, depends on comparison of a test sample comprising fluid medium to be analyzed for soluble silica with a blank sample wherein the fluid medium is brought up to volume by addition of distilled water in an amount equal to the volume of reagent solution added to the test sample. The failure of this procedure to provide compensation in the blank for optical effect of the reagents added to the test sample is objectionable. It requires that the reagents be analytically pure. Furthermore, it affords an important source of error in automatic monitoring systems where, to avoid the need for continuous servicing of the instrument, reagents are made up in large quantities, and are thus subject to aging and consequent darkening.

The reagent problem may be obviated in automatic instrumentation by adopting the alternative approach of providing a silica-free aqueous medium for the blank. This is accomplished, for example, by passing the fluid medium through a demineralizer to remove silica before it is fed to the blank sample. Then the same reagents are fed to the test and blank samples. A system adapted to this type of analysis is described in the copending application referred to hereinabove. It is reasonably reliable in continuous operation, but is subject to error because of dependence on the demineralizer unit: on the one hand, it may fail to remove all the silica from the water, especially when the unit has been in use for some time; and on the other hand, the unit may remove optically important constituents other than silica from the water, so that the samples are not truly comparable.

The present method may be employed advantageously in an embodiment representing an adaptation of the Armour method for soluble silica determination, conducted in accordance with the procedure provided hereby. The method of this invention avoids the errors and uncertainties of such analytical procedure as conducted hitherto, and is consequently accurate to considerably lower concentrations of soluble silica in water than have hitherto been measurable. Furthermore, it obviates the disadvantages hitherto associated with the operation of continuous analytical instrument systems designed for monitoring this component.

When the method of this invention is so employed for soluble silica determination, use will be made of the above-mentioned preferred practice in conducting the present method, wherein a buffer is provided to supply an equalizing effect. In the Armour method as described in the literature, an optical effect proportional to concentration of silica in the fluid medium is produced by reactions involving formation of silicomolybdic acid. To provide conditions favoring formation of this silicon compound, a molybdate salt is introduced into a medium comprising an aqueous solution of HCl at a pH of about 1.7. At the dilution provided for in the Armour method, hexamolybdic acid is formed, and this polymolybdic acid reacts readily with the soluble silica in the system to form the desired silicomolybdic acid. However, if it is attempted to employ the method of this invention with the Armour method reagents, difficulties are encountered. While in the test sample, the aqueous medium exerts a diluting effect, the aqueous medium is not present in the blank sample when the reagents are contacted with one another in accordance with the general procedure of this invention. If substantially undiluted hydrochloric acid is contacted with the molybdate salt, the reagents do not react in the same manner as occurs in the diluted test sample. The concentrated HCl causes the molybdate ion to form polymolybdic acids of much greater chain length than the desired hexamolybdic acid. These high molecular weight polymolybdic acids are insoluble, and are thrown out of solution to form a colloidal precipitate which obscures the optical effect to be measured, and prevents successful use of the method.

However, it has been found that this difficulty may be obviated if the Armour method is adapted for the purposes of this invention by substituting a buffer system for the HCl, as further described hereinafter. The buffer exerts an equalizing effect in the blank sample and in the test sample, so that equivalent media are provided in both for the requisite reactions to be conducted leading to development of the desired optical effect.

With the provision of a buffer medium, the soluble silica analysis may then be conducted in such manner that the reactions occuring in the test sample and in the blank sample follow a substantially parallel course. In broad outline the reactions involved will be as follows. The buffer reagent will establish a medium to which a molybdate salt will be added. The molybdate salt will form hexamolybdate $(Mo_6O_{21})^{-6}$ ions in this medium. Insofar as silicate ions are present in the medium, this complex hexamolybdate ion will react therewith to form silicopolymolybdic acid, with ions of formula $(SiMo_{12}O_{40})^{-4}$. The next step in developing the optical effect of the silicate ion will comprise the addition of a material effective as a short-stop reagent. The reaction between the silicate ion and the polymolybdic acid to form silicomolybdic acid will thereby be terminated; the silicomolybdic acid will not be destroyed, but its further formation will be inhibited. Finally, a reducing agent, as further defined hereinafter, is added. This, by reaction with the silicomolybdic acid, results in the formation of colloidal molybdenum blue. This colloidal material imparts turbidity to the samples, and the degree of turbidity is then measured by optical comparison of the test and blank samples. The turbidity produced is directly proportional to the concentration of silica originally present in the samples prior to addition of the short-stop reagent.

From the foregoing discussion it will be evident that the silica analysis method here considered involves an indirect process for the development of optical effect proportional to the concentration of the silica present. It requires four reagents for the practice of the method. One of these is the buffer system. Another of these is the short-stop reagent. The other two are reagents coacting with the component to be measured to produce the desired optical effect proportional to the concentration of component present.

Accordingly, as the first reagent in the practice of this method, there will be provided a buffer effective to maintain the required pH over the range of dilution to be encountered. In the present method this will be a pH of $1.6 \pm 0.2$. The range of dilution to be encountered in practicing the method will depend in part on the anticipated silica concentration to be measured, for the amounts of reagents required to develop the required optical effect will be adjusted in reference to this. However, as an approximate figure, it may be stated that a buffer effective to maintain a substantially stable pH over a range of about 30:1, dilution by volume will be satisfactory for the purposes of the invention.

A variety of organic and inorganic buffer systems may be employed; as is well known in the art, these buffer systems will comprise a combination of acid with a salt of the same acid. Selection of the acid to be employed will be made with a view to the avoidance of interfering effects. Thus, it being known that phosphorus interferes with the silica analysis, phosphorus acids will be avoided. Additionally, as will become evident hereinafter, organic polycarboxylic acids may exert a short-stopping effect on the reactions intended to be produced. However, insofar as these unfavorable effects are avoided in the selection of the buffer acid, a wide variety of systems are available which are useful for the desired purpose. Illustrative of inorganic acids which may be employed in the preparation of such buffers are sulfuric acid, sulfurous acid and pyrosulfuric acid; illustrative of organic acids which may similarly be employed to form a buffer maintaining the desired pH range are formic acid, picric acid, and dichlor- and trichloracetic acids.

To form a buffer system, the selected acid will be combined with a corresponding salt. The salts useful will be the water-soluble salts of the stated acids in which the cation of the salt is neutral or oxidizing. Such cations comprise, for example, sodium, potassium, lithium or ammonium ions. Illustrative of such salts are, for example, sodium sulfate, lithium sulfite, sodium formate, sodium dichloracetate, amonium sulfate, potassium pyrosulfate, potassium trichloracetate, lithium formate and so forth. The salt will be combined with the corresponding acid to form a buffer system. Buffer systems which may thus be provided will comprise, for example, combinations such as sodium sulfate/sulfuric acid, sodium pyrosulfate/ pyrosulfuric acid, lithium picrate/picric acid, and ammonium trichloracetate/trichloracetic acid. The preferred buffer system for use in conjunction with the present method will comprise a mixture of sulfuric acid and sodium sulfate.

To form the buffer system, the salt will be dissolved in a solvent, desirably water. So as to provide for the requisite ability to withstand dilution without substantial alteration of pH, a relatively concentrated solution will be preferred. This salt solution will be mixed with the corresponding acid until the pH of the solution is within the desired range, thus determining the proportion of acid to salt to be employed. With the preferred buffer system for use with the method of this invention, comprising a mixture of sulfuric acid and sodium sulfate, the salt will comprise about 25 mole-percent of the salt-acid mixture.

The second reagent employed in the practice of the invention will be reagent reactive with component to be measured to result in an optical effect. In the case of the silica analysis here under consideration, this will be an orthomolybdate salt. The presently useful molybdate salts will be those characterized by water solubility and in which the cation is a neutral or oxidizing ion such as sodium, potassium, lithium or ammonium. Ammonium molybdate is preferred. Conveniently, the molybdate salt will be employed in the form of an aqueous solution. To stabilize such solution of ammonium molybdate, it may be adjusted to about pH 5–6.

The third reagent employed in the practice of this method is reagent effective to short-stop reaction between the component to be measured and the reagent reactive therewith to result in an optical effect. In the present case this is the reaction of silicate ion with hexamolybdate ion, which will proceed irreversibly towards completion to the extent silicate is present in the medium to which the molybdate salt is added. Reagents effective to stop this reaction short and prevent its further occurrence comprise complexing agents of the class of polycarboxylic acids, especially dicarboxylic acids, the preferred class being low molecular weight dicarboxylic acids wherein the carboxylic groups are closely adjacent. Illustrative of acids of this class are for example tartaric acid, succinic acid and oxalic acid, oxalic acid being especially preferred. Again, this reagent will preferably be employed in the form of an aqueous solution.

In conjunction with analysis of aqueous systems for soluble silica, this reagent has an additional function, comprising the suppression of optical effect due to phosphorus in the aqueous medium. Phosphorus, in the form of water soluble ions, is a frequently encountered component of water subject to analysis for silica. The molybdate reagent employed in the present method to react with silica so as to result in an optical effect is equally reactive with phosphorus. The phosphomolybdic acid formed by such reaction can react by substantially the same mechanism as the silicomolybdic acid to give the optical effect to be measured ultimately in the practice of this method, that is, the formation of molybdenum blue. If this should take place, the optical effect resulting from phosphorus in the aqueous medium would obscure the effect due to silica, since the effect measured would be the additive effect of phosphorus and silica, rather than silica alone. However, the stated short-stop reagents destroy phosphomolybdic acid thereby preventing interference from this source.

Finally, reagent effective to develop the desired optical effect will be added to the foregoing reagents. As stated above, in the case of silica analysis in accordance with this method, the desired optical effect is produced indirectly. The silica reacts with hexamolybdate ion, and the resulting silicomolybdate is further treated to form molybdenum blue; the latter gives the optical effect of turbidity which is measured.

The reagent effective to develop the required optical effect herein is a reducing agent. The reducing agent used is a weak reducing agent. Suitable reagents usually comprise a two-component system, having as one member thereof, a reducing agent in which a two-electron change is required for the oxidation of a single atom thereof to produce reduction of another molecule. In combination therewith there will be introduced a synthetic catalytic material such that it can be both oxidized and reduced simultaneously in one-electron shifts. The former material, catalyzed by the latter, effectuates the required reduction of the silicomolybdic acid whereby molybdenum blue is formed.

A preferred reducing agent for use in the method of this invention is a water-soluble bisulfite salt, which may comprise, for example, an alkali metal salt such as sodium bisulfite, potassium bisulfite, lithium bisulfite or the like. Sodium bisulfite is preferred. Alternatively there may be employed as reducing agents other reagents of the qualities designated above, in which the reducing effect thereof depends on a two-electron change. Illustrative of these are for example nitrite salts such as sodium nitrite or potassium nitrite.

In the highly pure systems involved in the presently considered analytical methods, the stated reducing agents require a catalyst in order to insure their activity. The useful catalysts are those of a quinone type structure capable of simultaneous existence in the quinone, semiquinone and hydroquinone form, each in reasonable amount at the pH of the system. Aromatic compounds wherein either two hydroxyl groups, two amino groups, or a hydroxyl and an amino group are present in the ortho and/or para position give the requisite quinone type structure. The most preferred catalyst in this connection is 1-amino-2-naphthol-4-sulfonic acid, but other quinone type structures such a 4-methylaminonaphthol may alternatively be employed.

As indicated previously, it is desirable to formulate the reagents employed herein as solutions, to facilitate the handling thereof. Where, as here, it is a case of an aqueous fluid to be analyzed, aqueous solutions of the reagents are preferably employed. The stated catalysts are organic in nature; and may require addition of a salt of appropriate kind to be added to the aqueous medium to bring them into solution. The above-discussed reducing reagent and the catalyst therefor may and desirably will be combined in a single solution comprising the stated reagent effective to develop the required optical effect.

On completion of the preparation of the reagent solutions, the method of the invention will then be practiced therewith, observing the order of addition respectively to the test sample and the blank sample required to effectuate the method of the invention as described above. The absolute values of the quantities of reagents and aqueous medium to be analyzed which are added to the blank and test samples respectively are relatively unimportant. They need only be adjusted so that the reagents are introduced in sufficient amount to effectuate the desired purpose. It is, however, important that the measurements be repeatable and that identically the same defined amounts of each of the reagents and the aqueous medium be added to the test and to the blank samples. Control of quantities introduced is most conveniently accomplished when measurements are volumetric, and accordingly it is preferred to utilize the reagents employed in the form of solutions. Provided that the test and blank samples each contain equal amounts of the same substances, then the optical qualities of all of the substances entering into their composition will cancel out except for the optical effect resulting from the silica content of the aqueous medium. The optical qualities of the test and blank samples will then be photometrically measured, the difference therebetween affording a measure of the amount of silica present in the aqueous medium.

The preparation of the aforesaid samples, by admixing the said reagents and the aqueous medium to be analyzed in defined amount and sequence, and the measurement of the optical qualities thereof will advantageously be conducted in automatic monitoring photometric equipment as described in copending application, Serial Number 738,524, filed of even date herewith.

In order to illustrate the practice of the method of the invention there may be considered the following non-limiting example.

Example

Reagent solutions are prepared for use in the method of the invention as follows:

Reagent 1: This reagent solution, comprising a buffer system, is prepared by dissolving sodium sulfate in distilled water to form a solution containing about 15% by weight thereof. To this is added an equal volume of 30% solution of sulfuric acid in distilled water. The pH of the solution is then adjusted to 1.5 by addition of whatever further quantity of the sulfuric acid solution is necessary to attain this pH.

Reagent 2: This reagent solution comprises reagent reactive with silica to result in an optical effect, on subsequent introduction of developing reagent. It is prepared by dissolving ammonium molybdate in distilled water to form a saturated solution which is then diluted with an equal volume of distilled water.

Reagent 3: The short-stop reagent solution is prepared by dissolving oxalic acid in distilled water to form a saturated solution which is then diluted with an equal volume of distilled water.

Reagent 4: This reagent solution comprises reagent effective to develop the optical effect resulting from reaction of silica with the molybdate reagent, by a reducing reaction. It is prepared by dissolving sodium bisulfite in distilled water to form a saturated solution which is then diluted with an equal volume of distilled water. One gram of 1-amino-2-naphthol-4-sulfonic acid is dissolved in 50 cc. of water containing sufficient sodium sulfite to put the organic compound into solution, and the resulting solution of the naphtholsulfonic acid is diluted to 1 liter by addition of the previously prepared sodium bisulfite solution.

Proceeding then with the preparation of the sample and the blank, 50 cc. of aqueous medium to be analyzed for soluble silica is metered into a comparison cell or other container. No aqueous medium is added to the container for the blank sample. Then 2 ml. of reagent 1, comprising the buffer reagent, is metered into each of the comparison cells or other containers in which the blank and test samples are to be prepared. Next, 2 ml. of reagent 2, comprising the ammonium molybdate solution, is metered into each of the test and the blank samples. The test and blank samples are subjected to agitation to produce thorough mixture of the ingredients and then the mixtures are allowed to stand to provide time for the reactions to take place completely. Such time interval, for example, may comprise five minutes. Next 2 ml. of reagent 3, comprising oxalic acid solution, is metered to each of the blank and the test samples and again the mixtures are agitated to allow this reagent to exert its effect. The next stage comprises metering to each of the samples 2 ml. of reagent 4, comprising the reducing agent prepared as described above. Again the mixtures are agitated and a measurable time interval is allowed to elapse. Finally, 50 cc. of aqueous medium identical with that metered at the beginning of the preparation to the test sample is mixed with the blank sample, and this is agitated to produce full dispersion in the aqueous medium of any molybdenum blue formed by the reactions occuring in the reagents previously introduced to form the blank sample. Preparation of the samples now being complete, a photometric comparison is made of the samples or aliquot portions thereof, contained in comparison cells of substantially identical dimensions and mounted in a photometric circuit.

The circuit of the photometer in which the comparison cells are mounted will provide for light of a substantially single wave length (preferably, in this method, 830 m$\mu$) to be directed through each of the comparison cells onto a photo tube. The light transmission of the test sample and the light transmission of the blank sample will differ because of the optical effect produced by the molybdenum blue formed in the foregoing procedure. Accordingly, light of different intensities will fall on the phototubes connected with each cell. These phototubes will convert light energy to electrical energy and this difference in electrical energy will be converted into a value which is a measurement of the quantity of soluble silica in the aqueous test medium so analyzed.

It will be appreciated that the quantities of reagents and the concentrations thereof employed will vary depending on the concentration of silica to be anticipated in the aqueous medium. Other changes and variations may be made similarly in the procedure followed within the scope of the invention, as defined in the claims.

What is claimed is:

1. In a procedure wherein a test sample and a blank sample are provided for optical comparison, the method of preparing said blank sample which comprises sequentially mixing a plurality of reagents in defined amount and sequence, said reagents comprising a first reagent reactive with a unique component of a fluid medium to result in an optical effect, and a second reagent effective to short-stop reaction between said reagent and said component, the sequence of mixing being such that said second reagent is introduced subsequent to said first reagent; and thereafter mixing the resulting mixture of reagents with an aliquot portion of fluid medium to be analyzed for said unique component.

2. The method of claim 1 wherein said plurality of reagents comprises a buffer reagent.

3. In a procedure wherein a test sample and a blank sample are provided for optical comparison, the method of preparing said blank sample which comprises sequentially mixing in defined amount and in the following sequence, (1) a buffer reagent effective to maintain a substantially stable pH over the range of dilution to be produced in the preparation of said blank sample; (2) a reagent reactive with a unique component of a fluid medium to result in an optical effect; (3) a reagent effective to short-stop reaction between said reactive reagent and said component; and thereafter (4) an aliquot portion of fluid medium to be analyzed for said unique component.

4. The method of claim 3 wherein reagent effective to develop said optical effect is mixed with said buffer reagent, reactive reagent, and short-stop reagent after mixing said reagents with one another in the sequence defined in claim 3, but prior to addition of said fluid medium.

5. In a procedure for analysis of an aqueous medium for silica wherein a test sample and a blank sample are provided for optical comparison, the method of preparing said blank sample which comprises sequentially mixing in defined amount and in the following sequence (1) buffer reagent effective to maintain a substantially stable pH of about 1.6 over the range of dilution to be produced in the preparation of said blank sample; (2) reagent reactive with silica to result in an optical effect, comprising a molybdate salt; (3) reagent effective to short-stop reaction between said silica and molybdic acid comprising a polycarboxylic acid; (4) reagent effective to develop said optical effect, comprising a weak reducing agent; and thereafter (5) an aliquot portion of said aqueous medium to be analyzed for silica.

6. The method of claim 5 wherein said buffer reagent comprises an aqueous solution of a mixture of sulfuric acid and sodium sulfate.

7. The method of claim 6 wherein said short-stop reagent comprises a low molecular weight polycarboxylic acid.

8. The method of claim 7 wherein said reagent effective to develop said optical effect comprises a mixture of sodium bisulfite and as catalyst therefor, 1-amino-2-naphthol-4-sulfonic acid.

9. In a procedure for soluble silica analysis of an aqueous medium in which a test sample the optical qualities of which are to be measured is provided by the steps of adding to an aliquot portion of an aqueous medium, in defined amount and in the following sequence: (1) reagent effective to produce a defined pH in said medium; (2) an aqueous solution of a water soluble molybdate salt; (3) reagent effective to short-stop reaction between silica present in said aqueous medium and molybdic acid, and (4) reducing agent effective to cause the formation of molybdenum blue, said molybdenum blue exerting an appreciable effect on the optical qualities of said solution, the method of providing a blank sample to be compared with said test sample which comprises admixing said reagents with one another in the same defined amount and sequence as employed in providing the test sample, but deferring the introduction of the aqueous medium into the blank sample until after said short-stop reagent has been introduced into the mixture of reagents produced in preparing said blank sample.

10. The method of claim 9 wherein said reagent effective to produce a defined pH in said medium comprises a buffer solution effective to maintain a substantially stable pH of about 1.6 over the range of dilution to be encountered in the preparation of said blank sample.

11. In a procedure for the analysis of a fluid medium for a unique component by comparison of optical qualities of a test sample and a blank sample, the method for producing a test sample and a blank sample differing in optical quality by a value proportional to the concentration of said component of said medium which comprises preparing said test sample by sequentially mixing with an aliquot portion of said fluid medium, a plurality of reagents in defined amount and sequence said reagents comprising a first reagent reactive with said component to result in an optical effect, and a second reagent effective to short-stop the reaction of said reactive reagent with said component, the sequence of mixing being such that said second reagent is introduced subsequent to said first reagent; and preparing said blank sample by sequentially mixing said plurality of reagents in said defined amount and sequence and thereafter mixing the resulting mixture of reagents with an aliquot portion of said aqueous medium.

12. The procedure of claim 11 wherein said plurality of reagents includes a buffer solution effective to maintain a stable pH over the range of dilution encountered in the preparation of said samples.

13. In a procedure for the analysis of a fluid medium for a unique component by comparison of the optical qualities of a test sample and a blank sample, the method for producing a test sample and a blank sample differing in optical quality by a value proportional to the concentration of said component of said medium which comprises preparing said test sample by sequentially mixing with an aliquot portion of said fluid medium a plurality of reagents, in defined amount and in the following sequence, said reagents comprising: (1) a buffer reagent effective to maintain a substantially stable pH over the range of dilution to be produced in the preparation of said blank sample; (2) a reagent reactive with a unique component of a fluid medium to result in an optical effect; (3) a reagent effective to short-stop reaction between said reactive reagent and said component; and preparing said blank sample by sequentially mixing said plurality of reagents in said defined amount and sequence in the absence of said fluid medium and thereafter mixing the resulting mixture of reagents with an aliquot portion of said fluid medium.

14. In a procedure for the analysis of an aqueous medium for silica wherein a test sample and a blank sample are provided for optical comparison, the method which comprises preparing said test sample by mixing with an aliquot portion of aqueous medium to be analyzed for silica, a plurality of reagents in defined amount and in the following sequence, said reagents comprising (1) buffer reagent effective to maintain a substantially stable pH of about 1.6 over the range of dilution to be produced in the preparation of said blank sample; (2) reagent reactive with silica to result in an optical effect, comprising a molybdate salt; (3) reagent effective to short-stop reaction between said silica and molybdic acid comprising a polycarboxylic acid; and (4) reagent effective to develop said optical effect, comprising a reducing agent in which a two-election change is required for the oxidation of a single atom thereof; and a catalyst of a quinone type structure; and preparing said blank sample by sequentially mixing said plurality of reagents in said defined amount and sequence in the absence of said fluid medium, and thereafter mixing the resulting mixture of reagents with an aliquot portion of said aqueous medium.

15. The method of claim 14 where said buffer reagent comprises an aqueous solution of a mixture of sulfuric acid and sodium sulfate.

16. The method of claim 14 wherein said short-stop reagent comprises a low molecular weight polycarboxylic acid.

17. The method of claim 14 wherein said reagent effective to develop said optical effect comprises a mixture of sodium bisulfite and as catalyst therefor, 1-amino-2-naphthol-4-sulfonic acid.

18. The process for continuously monitoring the soluble silica content of an aqueous medium by a photometric method which comprises providing a bleed stream of said aqueous medium; providing a test sample by metering into a first comparison cell an aliquot portion of said aqueous medium and thereafter adding thereto, in defined amount and in the following sequence, aqueous reagent solutions comprising (1) buffer reagent comprising a sulfuric acid/sodium sulfate mixture: (2) reagent reactive with silica to result in an optical effect, comprising ammonium molybdate; (3) reagent effective to short-stop reaction between said silica and molybdic acid, comprising oxalic acid; and (4) reagent effective to develop said optical effect, comprising sodium bisulfite combined with a catalytic amount of 1-amino-2-naphthol-4-sulfonic acid; providing a blank sample in a second comparison cell by mixing said aqueous reagent solutions in said defined amount and sequence in the absence of said aqueous medium and thereafter mixing the resulting mixture of reagents with an aliquot portion of said aqueous medium; photometrically comparing the optical qualities of said test sample and said blank sample to determine the difference in optical qualities therebetween; and deriving from the optical comparative measurement a value for the amount of silica present in said aqueous medium.

References Cited in the file of this patent

UNITED STATES PATENTS 1,919,858  Pettingill _____ July 25, 1933

OTHER REFERENCES

Colorimetric Methods of Analysis by Snell, vol 1, 3rd edition, 1948, pages 37, 38, 39; vol. 2, 3rd edition, 1949, pages 695–698.

Analytical Chemistry, vol. 25, pages 146–148.

UNITED STATES PATENT OFFICE
CERTIFICATION OF CORRECTION

Patent No. 3,015,544                                   January 2, 1962

George E. Shaffer, Jr., et al.

It is hereby certified that error appears in the above numbered patent requiring correction and that the said Letters Patent should read as corrected below.

Column 1, line 18, for "critically" read criticality --; column 4, line 24, strike out "blank"; column 18, line 14, for "two-election" read -- two-electron --.

Signed and sealed this 24th day of April 1962.

(SEAL)
Attest:

ESTON G. JOHNSON                                 DAVID L. LADD
Attesting Officer                                     Commissioner of Patents

UNITED STATES PATENT OFFICE

CERTIFICATION OF CORRECTION

Patent No. 3,015,544                  January 2, 1962

George E. Shaffer, Jr., et al.

It is hereby certified that error appears in the above numbered patent requiring correction and that the said Letters Patent should read as corrected below.

Column 1, line 18, for "critically" read criticality --; column 4, line 24, strike out "blank"; column 18, line 14, for "two-election" read -- two-electron --.

Signed and sealed this 24th day of April 1962.

(SEAL)
Attest:

ESTON G. JOHNSON
Attesting Officer

DAVID L. LADD
Commissioner of Patents